June 22, 1954  R. H. DICKE  2,682,036
WAVE GUIDE POWER DIVIDER
Original Filed March 9, 1945
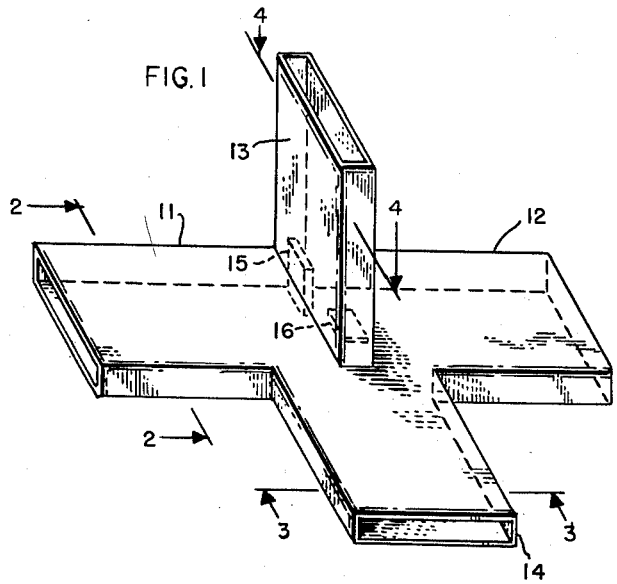
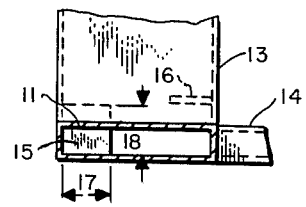 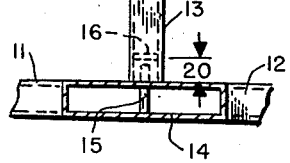 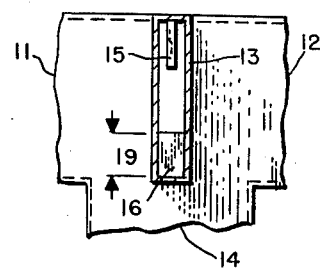
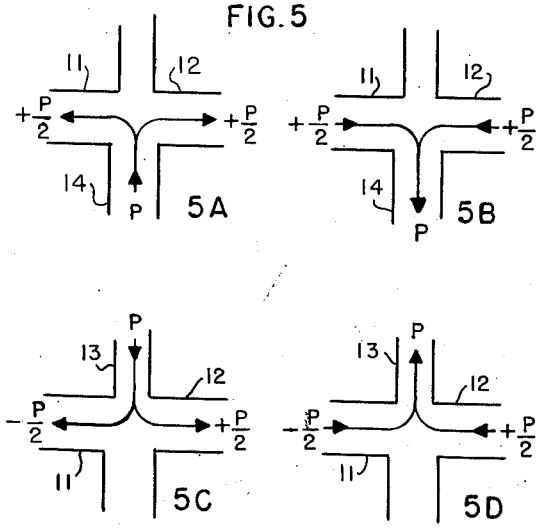
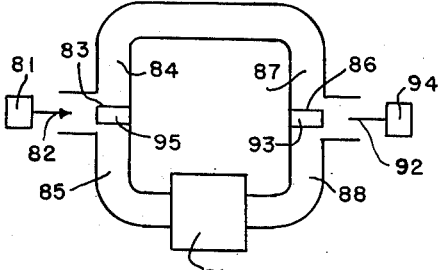
*INVENTOR.*
ROBERT H. DICKE
BY
Harry M. Saragovitz
*ATTORNEY*

Patented June 22, 1954

2,682,036

UNITED STATES PATENT OFFICE 2,682,036

WAVE GUIDE POWER DIVIDER

Robert H. Dicke, Cambridge, Mass., assignor, by mesne assignments, to the United States of America as represented by the Secretary of War Original application March 9, 1945, Serial No. 581,695, now Patent No. 2,593,120, dated April 15, 1952. Divided and this application March 19, 1952, Serial No. 282,037

2 Claims. (Cl. 333—7)

This application is a division of application Serial No. 581,695 entitled "Transmission Systems," which was filed March 9, 1945, and issued as Patent No. 2,593,120.

This invention relates to transmission systems and more particularly to wave guide power dividers for use with ultra high frequency energy.

According to conventional theory the dominant mode of operation of a wave guide may be defined as that condition of operation in which the configuration of electric and magnetic lines of force permits the transmission of energy at the lowest possible frequency through a wave guide of a given size and geometric cross-section. It may also be defined with equal accuracy as that condition of operation in which the configuration of electric and magnetic lines of force permits the transmission of energy through the smallest dimensional wave guide of a given cross-section at a given frequency.

In a rectangular wave guide operated in the dominant mode, there exists a sinusoidal distribution of electric lines of force along the major axis of the rectangular cross-section. These electric lines of force or electric field vectors are perpendicular to the major axis of the rectangle.

When a main rectangular wave guide designed to be operated in the dominant mode is joined symmetrically by a wave guide whose axis is parallel to the electric field vectors in the main wave guide, the juncture is said to be a series junction. When the joining wave guide is symmetrical to a main wave guide and the axis of the joining guide is perpendicular to the electric field vectors within the main guide, the junction is said to be a parallel junction. When these two junctures, one series and one parallel, are made in such a manner that the axes of the series and parallel wave guides join the axis of the main wave guide at the same point certain unique properties exist. Broadly, any geometric arrangement of four wave guide branches will also give these unique properties if the following conditions are met. The axes of the four guides must meet at a common point. In a first and second of these guide branches the electric lines of force are perpendicular to each other and the lines of force in one of these first and second wave guide branches must be perpendicular to a plane passing through the axes of the first and second wave guide branches. The third and fourth of these wave guide branches must be symmetrical with respect to the plane passing through the axes of the first and second wave guide branches which was just referred to. These unique properties are explained further in the detailed discussion of the drawings. It will be appreciated, however, by those skilled in the art that where any abrupt change in structure occurs, mismatch and consequent undesirable reflections also tend to occur. This is especially so where one wave guide branches into two or more wave guides. When a wave guide is terminated in its characteristic impedance, no mismatch or reflections will occur. The desirability of the unique properties referred to above render it advisable to eliminate the unwanted mismatch and reflections.

In certain radio communication systems a common radiating and receiving device, or antenna, is used for transmitting and receiving and in such systems a part of the channel for transmitted energy is common to a part of the channel for the received energy. There then exists the problem of preventing the transmitted energy, which is of normally higher level, from being partly spent in the receiver channel and damaging the receiving device. Conversely, there exists the problem of preventing the received energy of normally lower level from being wasted in the transmitter channel. In certain cases it is absolutely essential that the transmitted power be eliminated or at least minimized, from the receiver. A system of transmit-receive or T-R devices were made to achieve this purpose. However, there still existed at least two sources of trouble. The first was that an initial high level transmitted energy spike managed to escape the action of the T-R device and the second was that the T-R device was not capable of excluding from the receiving device a low level or plateau of energy.

Many methods have been employed in the past for matching or transforming one impedance to another. At the lower radio frequencies this is done with lumped circuits such as transformers or with line stubs such as the double stub tuner. For radio frequencies sufficiently high to warrant the use of wave guides these stub tuners can still be used but with increasing difficulty.

Oftentimes in radio work it is desired to variably attenuate or reduce a signal in magnitude. At low radio frequencies the problem is simple, but at frequencies for which wave guides are practical the problem of a variable attenuator becomes quite complex.

One object of this invention is, therefore, to terminate each wave guide at its junction with other wave guides in its characteristic impedance.

Still another object of this invention is to provide a variable attenuator, capable of handling large amounts of power, using matched wave guide junctions.

In accordance with the present invention there is provided a matched junction formed by three wave guides. One of the three wave guides is joined to a second of the three wave guides in a series junction. The third wave guide joins the second wave guide in a parallel junction. An iris, for matching purposes, is inserted in the second wave guide. It is mounted in such a position as to lie in a plane which also contains the axes of the first and third wave guides. A second iris is located within the first wave guide. The two irises are so adapted that each wave guide sees as its termination at the junction its characteristic impedance.

For a better and fuller understanding of the invention, together with other objects thereof, reference is made to the following detailed description taken in connection with the accompanying drawings in which:

Fig. 1 shows an improved wave guide junction;

Figs. 2, 3, and 4 show views looking into different wave guides making up the junction of Fig. 1 to show the position of matching irises;

Figs. 5A, 5B, 5C, and 5D facilitate describing some of the unique properties of the matched junction shown in Fig. 1; and Fig. 6 shows an improved variable attenuator system.

Referring now more particularly to Fig. 1, there is shown a matched junction formed by three wave guides. A first wave guide with two branches 11 and 12 is joined by a second wave guide 13, symmetrically in a series connection. A third wave guide 14 is joined symmetrically and in a parallel connection to the first wave guide 11—12. The series and parallel junctions are so made that the axes of the first, second, and third wave guides meet in a common point. Fig. 1 shows the wave guides 13 and 14 as being perpendicular to the wave guide 11—12. While this is a preferred embodiment, it is not desired to limit the invention here described to this geometric arrangement. Two irises 15 and 16, preferably in the form of thin plates of conducting material, are inserted at the junction to permit matching of all four wave guide branches, that is to say, looking from any one of the four wave guide branches toward the junction each of the wave guide branches will be terminated by its characteristic impedance. Fig. 2 shows the iris 15 partially closing off wave guide branch 11 as it is viewed from line 2—2 in Fig. 1. In Fig. 3 this same iris 15 is shown as it is viewed from line 3—3 in Fig. 1. Fig. 4 again shows the iris 15 as it is viewed from line 4—4 in Fig. 1. Figs. 2, 3, and 4 taken together show the iris 15 to be within the wave guide 11—12 and to lie in a plane which includes the axes of wave guides 13 and 14. By variation of the length 17 and the depth 18 of the iris 15 shown in Fig. 2, the iris 15 is adjusted empirically so that the third branch 14 is terminated in its characteristic impedance. Fig. 4 also shows the position of the iris 16. Figs. 2 and 4 taken together show the iris 16 to be within the wave guide 13. By variation of the length 19 of the iris 16 (Fig. 4) and the axial distance 20 of the iris 16 from the junction (Fig. 3), the iris 16 is adjusted empirically so that the second branch 13 is terminated in its characteristic impedance.

Referring now to Figs. 5A, 5B, 5C, and 5D specifically, there is shown four novel ways in which the matched junction of Fig. 1 operates. Although there are other novel modes in which a junction, such as is illustrated in Fig. 1, operates, the modes illustrated in Figs. 5A-5D inclusive are deemed sufficient for explanatory purposes. In Fig. 5A energy P, which enters the parallel connected wave guide 14, divides at the junction into the two branches 11 and 12 of main wave guide. The energy divides equally, and the two parts are in phase with each other as indicated by the designation $+(P/2)$ at the ends of each wave guide branches 11 and 12. In Fig. 5B the converse of the condition illustrated in Fig. 5A is shown. If energies of equal magnitude and similar phase $+(P/2)$ enter the two branches 11 and 12 of the main wave guide, these energies combine at the junction, and all of this energy enters the parallel connected wave guide 14 and is designated by P. In Fig. 5C is shown the condition where energy P enters the series connected wave guide 13. This energy divides equally and passes into the two branches 11 and 12 of the main guide. The two energies will be in 180° phase opposition as shown by the designation $-(P/2)$ at the end of guide branch 11 and the designation $+(P/2)$ at the end of guide branch 12 in this figure. Fig. 5D shows the converse of the condition shown in Fig. 5C. If energies of equal magnitude and in 180° phase opposition as indicated by $-(P/2)$ and $+(P/2)$, the energies will combine and will all enter the series connected wave guide 13. This energy is designated by P. To those skilled in the art, it will be obvious that energies which enter the two branches of the main guide but which are neither in phase nor in phase opposition will be combined and will divide going into both the series and the parallel connected wave guides. The relative division into the series and parallel connected wave guides will be a function of the phase relation existing between the two energies. This will be readily seen when one considers that either energy may be resolved into two components, one component in phase and one component in phase opposition to the other energy.

Referring now particularly to Fig. 6, there is shown a novel wide range variable attenuator designed for use in the ultra high frequency range and employing the matched junctions shown in Fig. 1. These matched junctions are preferred for use in this attenuator circuit. However, the circuit will function with junctions in which the matching irises are omitted. A power source 81 is connected to a parallel connected wave guide 82 of a first matched junction 83. A series connected wave guide 95 is terminated in an absorptive load, not shown, preferably a matched sand load. The branches 84 and 85 of the first junction 83 are connected, respectively, to branches 87 and 88 of a second matched junction 86. A variable line stretcher 91 is adapted to be a part of the energy path through guide branches 85—88. A variable line stretcher may be described as a section of line or wave guide whose electrical length is variable. A series connected wave guide 93 of the second junction 86 is terminated in an absorptive load, not shown, preferably a matched sand load. A parallel connected wave guide 92 of the junction 86 is connected to an active load 94.

In the operation of the apparatus shown in Fig. 6, energy from power source 81 enters wave guide 82. At the junction 83 the energy divides into wave guides 84 and 85 equally. Energy in wave guide 84—87 continues on to junction 86 where it is combined with energy which travels by means of the wave guide 85—88. The energy in wave guide 85—88, however, passes through the variable line stretcher 91 so that when it reaches the junction 86, its phase with respect to the energy arriving through wave guide 84—87 may differ anywhere from 0° to 360°. The division of energy between wave guide 92 and wave guide 93 depends upon the relative phases of the two energies arriving at the junction 93. It is evident, therefore, that the amount of energy going into either wave guide 92 or 93 can be controlled by adjusting the relative phases of the two energies arriving at the junction 86 by means of the line stretcher 91. The power source 81 and the sand load terminating guide 95 may be interchanged without affecting the operation of the attenuator. It is also to be understood that the line stretcher 91 may be located in either wave guide 84—87 or wave guide 85—89 or it may be located in both wave guides 84—87 and 85—89. Further it is understood that power source 81 and active load 94 may be interchanged if desired without departing from the true intent of this invention.

While there has been described what is at present considered the preferred embodiments of the invention, it will be obvious to those skilled in the art that various changes and modifications may be made thereon without departing from the invention, and it is, therefore, aimed in the appended claims to cover all such changes and modifications as fall within the true spirit and scope of the invention.

I claim:

1. An electrical apparatus comprising a first wave guide junction having four branches, two of said four branches forming a main wave guide, the first of the two remaining branches being series-connected to said main wave guide, the second of said two remaining branches being parallel-connected to said main wave guide, said four branches being so joined that their axes meet in a common point; a first iris inserted in said main wave guide in a plane containing the axes of said two remaining branches; a second iris inserted in said first of the remaining branches; said first and second irises being adapted to cause each of said four branches to be terminated at said first junction in its own characteristic impedance; a power source connected to one of said two remaining branches; a first absorber load connected to terminate the other of said two remaining branches; a second wave guide junction having four branches corresponding respectively to the four branches of said first junction; third and fourth irises positioned in said second junction to correspond in function and position to said first and second irises, an active load terminating one of the two remaining branches of said second junction; a second absorber load connected to terminate the other of the two remaining branches of said second junction, a first connecting means connecting one branch of the main wave guide of said first junction to one branch of the main wave guide of said second junction; a second connecting means connecting the other branch of the main wave guide of said first junction to the other branch of the main wave guide of said second junction; and means for changing the electrical length of at least one of the connecting means to vary the difference in electrical length between said first and second connecting means, to thereby control the division of power between the active load and the second absorber load at said second junction.

2. An electrical apparatus comprising a first wave guide junction having four branches, two of said four branches forming a main wave guide, the first of the two remaining branches being series-connected to said main wave guide, the second of said two remaining branches being parallel-connected to said main wave guide, said four branches being so joined that their axes meet in a common point; a power source connected to one of said two remaining branches; a first absorber load connected to terminate the other of said two remaining branches; a second wave guide junction having four branches corresponding respectively to the four branches of said first junction; an active load terminating one of the two remaining branches of said second wave guide; a second absorber load connected to terminate the other of the two remaining branches of said second wave guide junction, a first connecting means connecting one branch of the main wave guide of said first junction to one branch of the main wave guide of said second junction; a second connecting means connecting the other branch of the main wave guide of said first junction to the other branch of the main wave guide of said second junction; and means for changing the electrical length of at least one of the connecting means to vary the difference in electrical length between said first and second connecting means, to thereby control the division of power between the active load and the second absorber load at said second junction.

References Cited in the file of this patent

UNITED STATES PATENTS

| Number | Name | Date |
|---|---|---|
| 2,416,790 | Barrow | Jan. 28, 1941 |
| 2,445,895 | Tyrrell | July 27, 1948 |

OTHER REFERENCES

Pound, abstract of application No. 648,525; published Feb. 20, 1951, O. G. 643.